(12) United States Patent
Grosspietsch et al.

(10) Patent No.: US 10,097,063 B2
(45) Date of Patent: Oct. 9, 2018

(54) ASSEMBLY WITH AN ELECTRIC MACHINE

(71) Applicant: ZF FRIEDRICHSHAFEN AG, Friedrichshafen (DE)

(72) Inventors: Wolfgang Grosspietsch, Schweinfurt (DE); Gerald Viernekes, Hassfurt (DE); Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 281 days.

(21) Appl. No.: 15/024,940

(22) PCT Filed: Sep. 19, 2014

(86) PCT No.: PCT/EP2014/069987
§ 371 (c)(1),
(2) Date: Mar. 25, 2016

(87) PCT Pub. No.: WO2015/044045
PCT Pub. Date: Apr. 2, 2015

(65) Prior Publication Data
US 2016/0226336 A1    Aug. 4, 2016

(30) Foreign Application Priority Data

Sep. 25, 2013 (DE) .................. 10 2013 219 247

(51) Int. Cl.
*H02K 7/00* (2006.01)
*F16D 3/04* (2006.01)
(Continued)

(52) U.S. Cl.
CPC ............ *H02K 7/003* (2013.01); *B60K 6/26* (2013.01); *F16D 3/00* (2013.01); *F16D 3/04* (2013.01); *F16D 3/06* (2013.01); *F16F 15/1207* (2013.01); *H02K 1/2786* (2013.01); *H02K 1/28* (2013.01); *H02K 7/108* (2013.01); *B60K 2006/264* (2013.01); *F16F 15/00* (2013.01); *H02K 2213/09* (2013.01)

(58) Field of Classification Search
CPC .......... H02K 7/003; H02K 1/28; H02K 7/108
USPC ........................................ 310/78; 192/70.17
See application file for complete search history.

(56) References Cited

U.S. PATENT DOCUMENTS 5,030,865 A * 7/1991 Rockey ................. F16D 35/024
123/41.49
5,219,314 A 6/1993 Her et al.
(Continued)

FOREIGN PATENT DOCUMENTS

DE    44 04 791    3/1995
DE    199 14 376    10/1999
(Continued)

*Primary Examiner* — Hanh Nguyen
(74) *Attorney, Agent, or Firm* — Cozen O'Connor

(57) ABSTRACT

Constructional unit includes an electric machine with a stator and with a rotatable rotor, a rotatable output element operatively communicates with the rotor to transmit torque, and an offset arrangement. The offset arrangement is arranged between the rotor and the output element, and the transmission of torque is enabled in case of an axial offset and/or an angular offset between a rotational axis of the rotor and a rotational axis of the output element.

15 Claims, 1 Drawing Sheet

(51) Int. Cl.
    *H02K 1/28*         (2006.01)
    *B60K 6/26*         (2007.10)
    *F16D 3/00*         (2006.01)
    *F16D 3/06*         (2006.01)
    *F16F 15/12*       (2006.01)
    *H02K 1/27*         (2006.01)
    *H02K 7/108*       (2006.01)
    *F16F 15/00*       (2006.01)

(56) References Cited

U.S. PATENT DOCUMENTS

| | | | |
|---|---|---|---|
| 6,183,368 B1* | 2/2001 | King | F16D 3/68 |
| | | | 192/55.6 |
| 7,900,763 B2* | 3/2011 | Paumier | B60K 6/26 |
| | | | 180/65.21 |
| 2004/0104090 A1* | 6/2004 | Jansen | F16D 41/20 |
| | | | 192/41 S |
| 2007/0193843 A1* | 8/2007 | Uhler | F16D 13/52 |
| | | | 192/48.8 |

FOREIGN PATENT DOCUMENTS

| | | |
|---|---|---|
| DE | 100 02 830 | 8/2000 |
| DE | 199 43 037 | 3/2001 |
| DE | 10 2006 053 660 | 5/2008 |
| DE | 10 2012 200966 | 7/2013 |
| DE | 10 2012 216601 | 3/2014 |
| EP | 1 582 765 | 10/2005 |
| EP | 1 920 964 | 5/2008 |
| EP | 2 273 143 | 1/2011 |

\* cited by examiner

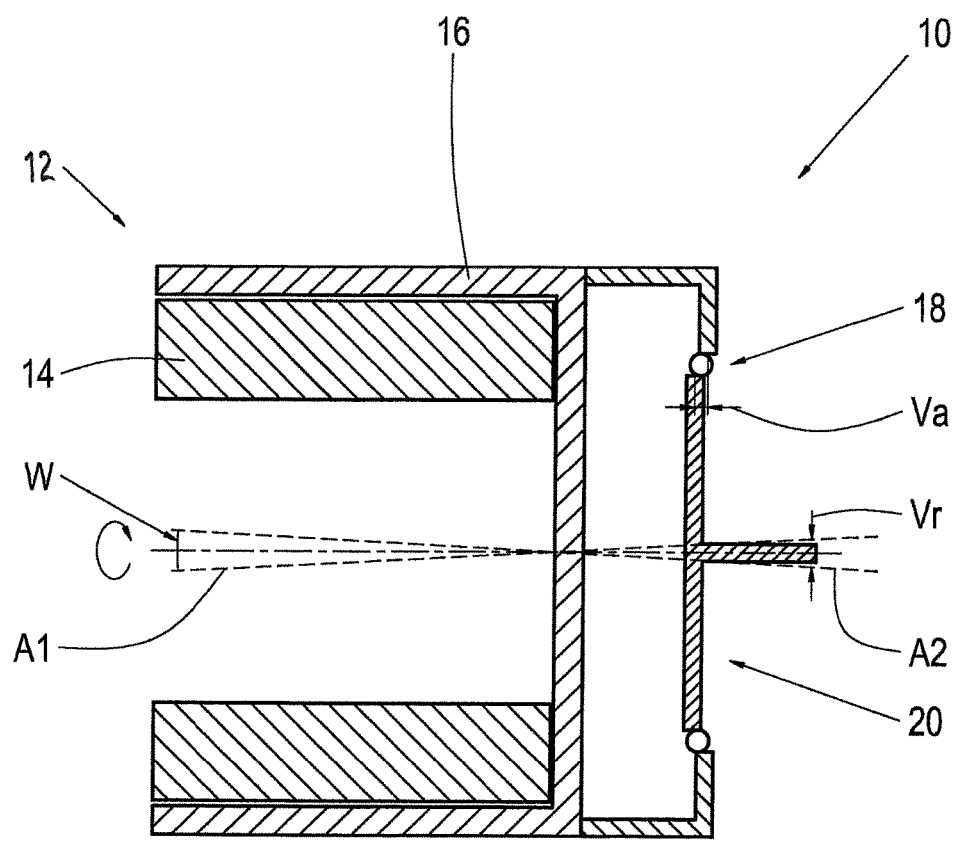

ASSEMBLY WITH AN ELECTRIC MACHINE

CROSS REFERENCE TO RELATED APPLICATIONS

This is a U.S. national stage of application No. PCT/EP2014/069987, filed on Sep. 19, 2014. Priority is claimed on German Application No. DE102013219247.9, filed Sep. 25, 2013, the content of which is incorporated here by reference.

BACKGROUND OF THE INVENTION

1. Field of the Invention

The invention is directed to a constructional unit including an electric machine with a stator and with a rotatable rotor, a rotatable output element that operatively communicates with the rotor to transmit torque, and an offset arrangement.

2. Description of the Prior Art

A generic constructional unit of the type mentioned above is disclosed in DE 10 2006 053 660 A1 and has an electric machine, torsion damper, and internal combustion engine that is separably operatively connected to the rotor of the electric machine via a clutch disk. due to tolerances in manufacture and assembly and due to wobbling movements of the crankshaft, axial offsets as well as angular offsets occur between the rotational axes of the various modules in the powertrain, for example, the rotational axis of a crankshaft of the internal combustion engine, a rotational axis of the rotor of the electric machine, a transmission input shaft of a shift transmission, etc. These offsets between the individual shafts of the modules are compensated in the above-cited disclosure through an offset device, particularly a wobble-absorbing bearing support of the rotor relative to the stator, and a variety of bearing variants for the arrangement of the rotor at the stator are described. With present-day offsets of 1 mm and more, this wobble-absorbing bearing support is exposed to very high loads, which has a negative influence on the electric machine.

It should be noted that the offsets are not compensated or eliminated; rather, torque transfer is simply enabled between two rotatable component parts whose rotational axes are misaligned.

A further possibility for implementing torque transmission in case of offset is shown in DE 100 02 830 B4 with respect to an independent clutch disk which, however, is not a constructional unit of the generic type mentioned above. In this case, a driver disk is operatively connected to a hub disk via teeth with the intermediary of coil springs so as to form a shaft offset arrangement. The teeth offer sufficient backlash in radial direction and circumferential direction so that the driver disk and hub disk can have different axes of rotation to a certain extent but are nevertheless torque-transmittingly connected via the coil springs.

In hybrid vehicles and electric vehicles, electric machines are used as drive motors or are integrated within the powertrain to assist a main drive. Therefore, as a result of the modular type of construction, there are usually a plurality of modules lined up in the powertrain. Requirements respecting manufacturing tolerances and assembly tolerances must be strict to prevent shaft offsets between the modules. These offsets can be eliminated at high expenditure, for example, through high-precision manufacture and corresponding arrangements for centering and bearing support, which align the modules with respect to one another, for example, pilot bearings. This requires corresponding additional installation space.

SUMMARY OF THE INVENTION

Therefore, one aspect of the invention is to integrate an offset arrangement in a generic constructional unit in a space-saving, inexpensive manner.

One aspect of the invention proposes a generic constructional unit in which the offset arrangement is arranged between the rotor and the output element, and the transmission of torque is enabled in case of an axial offset and/or an angular offset between a rotational axis of the rotor and a rotational axis of the output element.

The fact is that more and more subassemblies, for example, torsion dampers, actuating elements or clutches, are arranged inside the same module. Due to the resulting lack of space, it is advantageous when individual subassemblies can be integrated in different positions of a module. A possibility is described herein for integrating a torque-transmitting offset arrangement in a constructional unit between the electric machine and the output element.

Further, a torque-transmitting offset arrangement of the type mentioned above—in contrast to the wobble-absorbing bearing support of the rotor at the stator from DE 10 2006 053 660 A1—is integrated as independent subassembly in the force path or torque path of the constructional unit. This substantially reduces loading of the bearing between the rotor and the stator of the electric machine.

In addition to this, a torque-transmitting offset arrangement of this type considerably reduces the demands on assembly tolerances and manufacturing tolerances and can be integrated in a relatively inexpensive, space-saving manner with low fabrication costs.

A constructional unit of this type produces an operative connection between two rotatable component parts, particularly a torque transfer between the rotor and the output element, where the axis of rotation of the rotor and the axis of rotation of the output element have, or can have, an axial offset (in axial direction) and/or a radial offset and/or a tilt with respect to one another. The rotational axis of the output element is predetermined by a shaft of another module, the output element being operatively connected to this shaft, e.g., a transmission input shaft of a shift transmission, so as to be fixed with respect to rotation relative to it. These offsets change continuously during operation due to, among other things, wobbling movements of the various components. Since axial offsets also occur, the offset arrangement has an axial degree of freedom. Therefore, the output element is axially displaceable relative to the rotor.

Axial offsets, radial offsets, and tilt offsets are induced, inter alia, by a drive motor, for example, an internal combustion engine, whose crankshaft bends as a result of force being introduced in a non-uniform, instantaneous manner such that wobbling movement is stimulated. This wobbling movement is subsequently transmitted to other modules in the powertrain.

The offset arrangement is advantageous precisely in long module chains because manufacturing tolerances combined with the spaced-apart assembly points of the individual modules make it difficult to align all of the rotational axes of the individual modules relative to one another in a precise manner. The more modules being used, the greater and more problematic the offsets.

In a possible constructional variant, it has proven advantageous when the offset arrangement has a drive element, a driven element, and at least one flexible element, which flexible element is functionally arranged between the drive element and the driven element. In this case, the rotor of the electric machine is connected to the drive element to be fixed with respect to rotation relative to it or is fixedly connected to the drive element, and the rotor predetermines the rotational axis for the drive element. On the other hand, the rotational axis of the driven element is predetermined by the rotational axis of the output element, and the drive element and output element are fixedly connected to one another or are connected to one another to be fixed with respect to rotation relative to one another. In order to implement a transfer of torque between drive element and driven element, the latter are operatively connected to one another by one or more flexible elements. While only one flexible element will be described in the following, the description applies to all of the flexible elements.

In principle, the functional drive element can be formed by the rotor or a rotor support of the rotor and/or the functional driven element can be formed by the output element. The offset arrangement can be formed in a very compact manner by integrating the functional drive element and driven element in other component parts.

Further, it is advantageous when the drive element is connected to the rotor in a radially outer region. If the drive element is formed by the rotor support, it is preferably arranged in a radially outer region. This is advantageous and necessary to provide as much installation space as possible in the radially inner region of the subassembly for other subassemblies.

It is further advantageous when the drive element, the driven element and the flexible element are arranged radially relative to one another. This allows a save-saving type of construction in axial direction.

It is suggested that clearance gaps are provided in radial direction and in axial direction between the drive element and the driven element to allow a radial offset, an axial offset and a tilting of the drive element and driven element relative to one another. In the normal operating state, the drive element and the driven element can have an axial offset, a radial offset and/or a tilt relative to one another without touching or coming in contact with one another. However, it may be advantageous and also necessary for one or more component parts of the offset arrangement to touch or serve as stop in certain operating states.

For example, the drive element and driven element can have cutouts which pair, respectively, to form a receptacle in which the flexible element is arranged. A receptacle of this kind can be shaped in such a way that the flexible element is supported by its ends located in circumferential direction at the drive element and at the driven element and generates an operative connection.

On the one hand, the flexible element is preferably stiff in circumferential direction so that torque can be transmitted between the drive element and driven element with the least possible losses and, as far as possible, without relative vibration or torsional vibration. On the other hand, the flexible element is configured with a high spring rate and low compressibility in circumferential direction or working direction. Viewed transverse to the circumferential direction or working direction, the flexible element is preferably constructed to be flexible so that relative movements between the drive element and the driven element in transverse direction relative to one another can be carried out to be free from forces as much as possible. This can be achieved, for example, by a flexible element, particularly a coil spring, having a length that is large compared to the diameter or width of the flexible element. The length of the flexible element is advantageously at least twice the diameter or width of the flexible element. Further, there is the possibility of selecting the spring constant and/or bending moment of the flexible element such that it is stiff in circumferential direction or working direction and flexible in transverse direction.

The flexible element and the associated receptacle are formed in such a way that the flexible element is neither plastically deformed nor damaged at maximum axial offset, radial offset or tilting offset, nor is the functioning otherwise negatively affected.

While one constructional variant is given for the description of the drawings, other offset arrangements within the meaning of the invention can also be used.

As has already been mentioned, it is extremely advantageous when the drive element is connected to the rotor to be fixed with respect to rotation relative to it or is fixedly connected to the rotor and when the driven element is connected to the output element to be fixed with respect to rotation relative to it or is fixedly connected to the output element.

According to a preferred embodiment, it is extremely advisable that the rotor is rotatable within limits with respect to the output element or that the drive element is rotatable within limits with respect to the driven element. Since the relative rotations and torsional vibrations between the drive element and driven element are to be minimized, it is advantageous when the flexible element has a high spring force or high spring constant. As a result of this high spring force, a relative rotational angle between rotor and output element or drive element and driven element is small and the torque transmission is very direct. The flexible element is preferably formed in such a way that the rotational angle between output element and input element or between drive element and driven element substantially does not exceed a rotational angle of 5°.

In a further development, the rotational angle between output element and rotor or between drive element and driven element is limited by a stop. Among other things, the stop prevents an overloading of, or damage to, the flexible element as a result of an excessively large twist angle. When a coil spring is used as flexible element, this coil spring could possibly go solid and accordingly become damaged. Further, the stop limits the rotational angle because a relative rotation and torsional vibrations are to be prevented as far as possible.

In a further development, it has proven particularly advisable when the offset arrangement has at least three flexible elements. In an advantageous manner, these flexible elements are to be arranged uniformly in circumferential direction regardless of quantity.

Further, it has proven advantageous when the flexible element is constructed as a coil spring.

It is suggested that at least the flexible element or flexible elements and contact regions of the drive element and of the driven element which a flexible element contacts or with which it can come in contact are formed as steel material parts. Alternatively, all of the components of the offset arrangement can be formed as steel material parts.

In a further development, at least the flexible element or the flexible elements and contact regions of the drive element and of the driven element, which a flexible element contacts or with which it can come in contact are hardened. Hardening inhibits a flexible element, particularly a coil spring, from working into the material, for example. Typically, coil springs are likewise hardened. Hardening is particularly advantageous at contact regions of the flexible elements. However, it can also certainly be advantageous for further component parts and/or the drive element and the driven element in their entirety to be hardened.

The constructional unit is advantageously arranged at a drive motor with crankshaft, the rotor being operatively connected to the crankshaft. A further component part, for example, an intermediate shaft, can be arranged between crankshaft and rotor. The electric machine can serve in combination with the drive motor, for example, an internal combustion engine, as auxiliary motor, as current generator or alternator or as starter.

Further, it is advantageous when the constructional unit has a clutch mechanism for selectively interrupting the transfer of torque between the crankshaft and the rotor. In an arrangement of this type, it is possible that the electric machine can serve as an independent drive motor in addition to the functions already mentioned.

It is suggested that at least the constructional unit is formed with the electric machine, the offset arrangement and the output element inside as preassembled assembly module. Further components such as clutch mechanism and intermediate shaft can also be integrated in the assembly module as needed. This has the advantage that the constructional unit can be preassembled as a modular unit. This allows a simple installation of an individual assembly module when installing the constructional unit.

BRIEF DESCRIPTION OF THE DRAWINGS

The invention will be described by way of example in the following with reference to the accompanying drawings. The drawings show:

FIG. 1 is a schematic construction of a constructional unit with an electric machine;

FIG. 2 is a constructional variant of the constructional unit from FIG. 1; and

FIG. 3 is a view of a section from an offset arrangement of the constructional unit with electric machine.

DETAILED DESCRIPTION OF THE PRESENTLY PREFERRED EMBODIMENTS

FIG. 1 shows a schematic construction of a constructional unit 10 with an electric machine 12. The electric machine 12 comprises a stationary stator 14 and a rotor 16. The rotor 16 is arranged so as to be freely rotatable around the rotational axis A1 radially outside of the stator 14 and freely rotatable relative to the stator 14 (external rotor type construction). In another variant, not shown, the rotor 16 can also be arranged in some other manner with respect to the stator 16, for example, inside of or axially lateral to the stator 14. Further, the rotor 16 is operatively connected via an offset arrangement 18 to an output element 20. A possible construction and the manner of functioning of the offset arrangement 18 will be described later referring to FIG. 2. The output element 20 is arranged so as to be freely rotatable around a rotational axis A2 which is different than, and not coaxial to, the rotational axis A1 of the rotor 16. The rotational axis A1 of the rotor 16 and the rotational axis A2 of the output element 20 can have an angle W (tilt) and/or a radial offset Vr relative to one another which can change within certain limits inter alia during the operation of the constructional unit 10. Further, the output element 20 can have an axial offset Va with respect to the rotor 16, which axial offset Va can likewise change within certain limits during the operation of the constructional unit 10.

FIG. 2 and FIG. 3 show a constructional variant of the constructional unit 10 described schematically above. Compared to the schematically described constructional unit 10, this constructional variant has some additional component parts which, however, are not absolutely necessary.

The constructional unit 10 has a stator 14 and a rotor 16 which surrounds the stator on the radially outer side (external rotor type construction). The stator 14 and the rotor 16 are part of an electric machine 12 which inter alia can also be constructed as an internal rotor type or in another variant.

The pot-shaped rotor 16 is supported via a bearing 23 at an input shaft 22; the rotor 16 and the input shaft 22 share a common rotational axis A1. The input shaft 22 is constructed in this instance particularly as a hollow shaft. Further, the input shaft 22 is separably operatively connected to the rotor 16 via a clutch mechanism 24 so as to allow torque to be transmitted. The clutch mechanism 24 can be a conventional clutch 24 used in the powertrain, particularly a dry or wet friction clutch 24. As regards the construction of the clutch mechanism 24, reference is made to Application Number DE 102012216601.7. The input shaft 22 is operatively connected to an output shaft 3 of an upstream drive motor 2, particularly to the crankshaft 3 of an internal combustion engine, so as to be fixed with respect to rotation relative to it. The drive motor 2 with output shaft 3 and the clutch mechanism 24 and input shaft 22 are optional in this case, although an additional drive motor 2 substantially increases the flexibility and usefulness of the constructional unit 10. In a drive motor 2 which can be connected in this way, the electric machine 12 can carry out various tasks which have already been explained in the preceding description.

As in the schematic embodiment example shown in FIG. 1, the rotor 16 is operatively connected to an output element 20 via an offset arrangement 18. Further, the rotor 16 forms a rotor support 17 shown in FIG. 2. This offset arrangement 18 has a plurality of flexible elements 28, a drive element 26 and a driven element 30. In this case, the offset arrangement 18 is arranged axially lateral to the electric machine 12 on the side facing away from the drive motor 2. Further, the drive element 26 is radially enclosed by the driven element 30, which is constructed in the form of a sheet metal part, and is covered by the driven element 30 on the side facing away from the electric machine 12. Further, the drive element 26 is fixedly connected to the rotor 16, and the driven element 30 is fixedly connected to the output element 20, the output element 20 being arranged radially within the offset arrangement 18. A shift transmission 6, whose transmission input shaft 7 is operatively connected to the output element 20, can be arranged, for example, downstream of the output element 20. It will be recognized that the drive element 26 also serves inter alia as pressure plate for the clutch mechanism 24.

To allow an operative connection between the drive element 26 and the driven element 30, the drive element 26 and the driven element 30, respectively, have a plurality of cutouts 32 which are uniformly distributed in circumferential direction and which in pairs in each instance form receptacles 34 for flexible elements 28. The flexible elements 28 are arranged at the drive element 26, which is constructed in this case as a solid part, inside of grooves 32 which form contact regions 36a inward in radial direction and two contact regions or contact surfaces 36b in circumferential direction for the flexible elements 28. At the sheet-metal shaped driven element 30, the flexible elements 28 located in circumferential direction extend through the driven element 30 in radial direction within stamped regions 32. These stamped regions 32 are shaped in such a way that the flexible elements 28 are limited in circumferential direction by contact regions 36c and are freely movable so as to be limited radially outwardly by contact regions 36d at guides 38 or spring guides 38. The spring guides 38 serve inter alia to secure the flexible elements 28 against centrifugal forces. The spring guides 38 are constructed in circumferential direction over only a portion of the length of the flexible elements 28 so as to ensure that the ends of the flexible elements 28 can move with greater freedom in radial direction. This free movability of the ends is necessary in order that the drive element 26 can tilt W and have a radial offset Vr relative to the driven element 30. In order to minimize the force effect of the flexible elements 28 in radial direction during a radial offset Vr, the flexible element 28 is constructed so as to be long with a small diameter. In coil springs 28 with a high spring constant, for example, this results in high stiffness and low compressibility in the working direction or circumferential direction compared to a low stiffness and high flexibility in transverse direction. In principle, it is advantageous that the spring stiffness in working direction is high compared to the spring stiffness in transverse direction. In a suitable manner, the flexibility in transverse direction or working direction must be high relative to the flexibility in circumferential direction or working direction. Therefore, the flexible element 28 allows a very direct transfer of torque between drive element 26 and driven element 30, resulting in a movability which is as free as possible from force during axial offset, radial offset and tilting.

When the drive element 26 is subject to torque, a force is transmitted via the contact region 36b to the flexible element 28 which acts on the opposing contact region 36c of the driven element 30 and transmits the torque. Torque transmission in both directions is also possible.

The drive element 26, the driven element 30 and the flexible elements 28 are configured in such a way that a radial offset Vr, an angular offset W (tilt) and an axial offset Va are possible within a certain scope without the various component parts being tilted, going solid or being affected in some other manner with regard to function. This is ensured, for one, by providing a radial gap d between drive element 26 and driven element 30 (clearance gap) which, with identical or coaxial rotational axes A1 and A2, is at least as large as the maximum possible axial offset of the rotational axes A1 and A2. Further clearance gaps are maintained in order to prevent contact between drive element 26 and driven element 30 during axial offset, radial offset and tilting. In order to prevent the ends of the flexible elements 28 between drive element 26 and driven element 30 from going solid in radial direction during a radial shaft offset, the spring guides 38 are constructed only in the center of the flexible elements 28. However, it can be advantageous and also necessary for the component parts of the offset arrangement 18 to contact or serve as stop in certain operating states.

The drive element 26 further has a stop element 40 which radially penetrates the driven element 30 at a stop opening 42 and can make contact with stop regions 44 of the driven element 30 in circumferential direction. The stop element 40 and stop region 44 are constructed in such a way that the rotational angle between drive element 26 and driven element 30 is limited. However, a functional limiting of the rotational angle depends on requirements and is therefore optional.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A constructional unit comprising:
    an electric machine having a stator and with a rotatable rotor;
    a rotatable output element that operatively communicates with the rotatable rotor to transmit torque; and
    an offset arrangement arranged between the rotatable rotor and the rotatable output element, wherein the offset arrangement comprises:
    a drive element;
    a driven element; and
    at least one flexible element functionally arranged between the drive element and the driven element,
    wherein the transmission of torque is enabled in case of an axial offset and/or an angular offset between a rotational axis of the rotatable rotor and a rotational axis of the rotatable output element, and
    wherein the drive element and the driven element have respective cutouts, which in pairs, form a receptacle, wherein the elastic element is arranged inside the receptacle.

2. The constructional unit according to claim 1, wherein the rotatable output element is axially displaceable relative to the rotatable rotor.

3. The constructional unit according to claim 1, wherein clearance gaps are provided in radial direction and in axial direction between the drive element and the driven element to allow at least one of an axial offset, a radial offset, and a tilting of the drive element and the driven element relative to one another.

4. The constructional unit according to claim 3, wherein the drive element is connected to the rotatable rotor to be fixed with respect to rotation relative to it, and the driven element is connected to the rotatable output element to be fixed with respect to rotation relative to it.

5. The constructional unit according to claim 1, wherein the drive element is connected to the rotatable rotor in a radially outer region.

6. The constructional unit according to claim 1, wherein the drive element, the driven element, and the at least one flexible element are arranged radially relative to one another.

7. The constructional unit according to claim 1, wherein at least one of:
    the drive element is formed by a rotor support of the rotatable rotor and
    the driven element is formed by the rotatable output element.

8. The constructional unit according to claim 1, further comprising:
    a stop configured to limit a rotational angle between the rotatable rotor and the driven element.

9. The constructional unit according to claim 1, wherein the offset arrangement comprises at least three flexible elements arranged so as to be uniformly distributed in circumferential direction.

10. The constructional unit according to claim 1, wherein the at least one flexible element is constructed as a coil spring.

11. The constructional unit according to claim 1, wherein at least one of the at least one flexible element, the drive element, and the driven element is formed as steel material parts.

12. The constructional unit according to claim 1, wherein at least the at least one flexible element and contact regions of the drive element and of the driven element which a respective flexible element contacts or with which it can come in contact are hardened.

13. The constructional unit according to claim 1, wherein the constructional unit is arranged at a drive motor with crankshaft, wherein the rotatable rotor is operatively connected to the crankshaft.

14. The constructional unit according to claim 13, wherein the constructional unit has a clutch mechanism for selectively interrupting the transfer of torque between the crankshaft and the rotatable rotor.

15. The constructional unit according to claim 1, wherein the constructional unit is formed with the electric machine, the rotatable output element, and the offset arrangement as a preassembled assembly module.

* * * * *